United States Patent [19] [11] Patent Number: 5,024,345
Deweerdt [45] Date of Patent: Jun. 18, 1991

[54] VEHICLE AIR VENTING CAP

[75] Inventor: Kevin R. Deweerdt, Walled Lake, Mich.

[73] Assignee: Chrysler Corporation, Highland Park, Mich.

[21] Appl. No.: 625,200

[22] Filed: Dec. 10, 1990

[51] Int. Cl.[5] .................. B65D 51/16; F16H 57/04
[52] U.S. Cl. .................. 220/366; 220/374; 74/606 R; 138/89
[58] Field of Search ....... 220/366, 373, 374, DIG. 19, 220/DIG. 27; 74/606 R; 137/846, 854; 138/40, 89.1, 89.2, 89.3, 89.4, 109, 42, 89; 215/307, 355, 344, 345

[56] References Cited

U.S. PATENT DOCUMENTS

| | | | |
|---|---|---|---|
| 1,452,259 | 4/1923 | Snell | 220/366 X |
| 3,021,029 | 2/1962 | McKinlay | 220/366 X |
| 3,314,306 | 4/1967 | Barclae | 74/606 R |
| 3,422,982 | 1/1969 | Terwoerds et al. | 220/366 |
| 3,686,973 | 8/1972 | Davison, Jr. et al. | 74/606 R |
| 4,304,233 | 12/1981 | Muriot | 215/307 |
| 4,351,203 | 9/1982 | Fukunaga | 74/606 R |
| 4,399,743 | 8/1983 | Izzi, Sr. | 220/366 X |
| 4,506,562 | 3/1985 | Yamaura et al. | 220/374 X |
| 4,595,118 | 6/1986 | Azuma et al. | 220/374 |

Primary Examiner—Gary E. Elkins
Assistant Examiner—Paul Schwarz
Attorney, Agent, or Firm—Edward P. Barthel

[57] ABSTRACT

A one piece plastic vent cap having its open end adapted for receiving one end of a flexible hollow conduit with the conduit other end connected to a vent hole in a housing enclosing a vehicle component. The vent cap closed end if formed a central stem element projecting axially therefrom with a plurality of radial ribs interconnecting the stem element with the cap cylindrical side wall. The ribs are L-shaped defining with the central stem element a concentric space adapted for flexibly receiving one end of the conduit with the stem element telescoped within the conduit passage. Upon the conduit being inserted in the cap the conduit internal and external surfaces cooperate with the cap structure to define axial inner and outer flow passages communicating with a crossover flow passage allowing ventilation of the housing to the atmosphere.

4 Claims, 2 Drawing Sheets

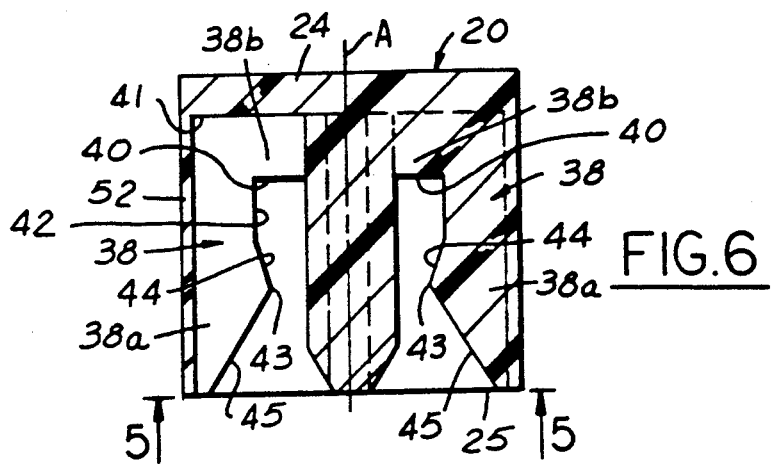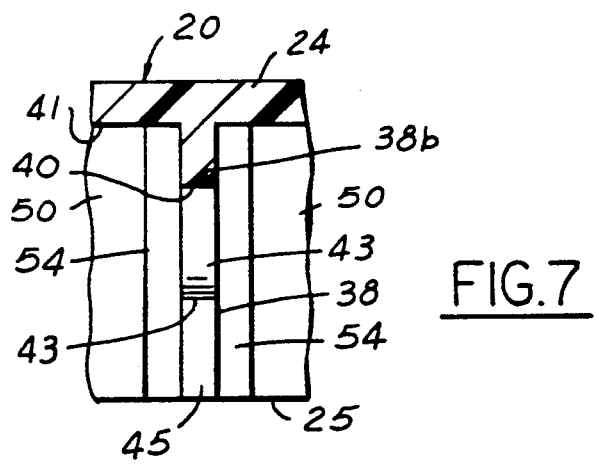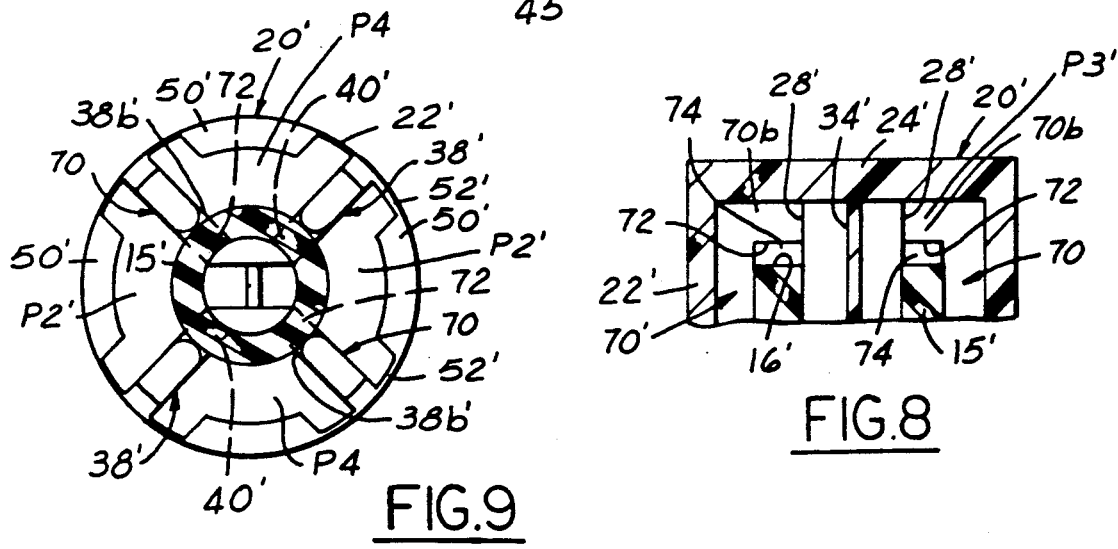

VEHICLE AIR VENTING CAP

BACKGROUND OF THE INVENTION

This invention relates to an air venting device for an automotive vehicle enclosed housing, and more particularly to a one piece air venting cap adapted for use with a flexible tubular member.

The prior art is replete with air bleeding or venting devices for an automotive vehicle enclosed housing, such as an axle housing or a gear housing. The U.S. Pat. No. 4,506,562 issued Mar. 26, 1985 to Yamaura et al. discloses a unitary air bleed device of an elastomeric deformable material and has an integrally formed head portion with a vent hole and a cylindrical portion. The cylindrical portion is formed with a connecting passage which communicates with the vent hole of the head portion. The deformation of the air bleed device permits it to be mounted to an enclosed housing by press fitting. When mounted, the cylindrical portion extends into the housing in such a direction to prevent the oil entry into the connecting passage.

The U.S. Pat. No. 4,595,118 issued June 17, 1986 to Azuma et al. discloses an air-breather device for an oil casing filled with oil and accommodating a driving mechanism such as a vehicle differential gear casing. The air-breather device comprises a cylindrical breather plug deflector attached to the wall of the oil casing and having an end opening into the oil casing, a breather plug having an open end opening into the breather plug in the oil casing and the other open end which opens to the outside of the oil casing. The other open end is normally closed by a spring-urged cover, and a baffle plate is attached to the breather plug deflector on the upstream side thereof so as to intercept the flow of oil which tends to flow into the opening of the end of the breather plug within the casing.

An example of a currently used vent cap for an automotive axle housing is shown in FIGS. 1 and 1A and denoted as prior art. The vertical cross section of FIG. 1 shows a vent cap assembly 10' comprising a cylindrical body member 12' and a cap member 14'. The body member 12' has a hollow cylinder 16' defining a hollow chamber 18' and having its upper edge formed with a peripheral collar portion 20' which extends radially outwardly so as to overhang the cylinder outer surface. The cylinder lower end is formed with an axially extending hollow tubular stem portion 22' communicating, via central aperture 24', with the cylinder chamber 18'. A flexible hollow conduit 26' is shown with one end 28' thereof telescopically press fitted on the stem portion 22' with the conduit other end adapted for sealing connection to an axil housing or the like (not shown).

The cap member 14' has a depending skirt portion 30' having a diameter a predetermined dimension larger than the cylinder diameter. The skirt portion 30' is formed with an internal circumferential rib 32' sized such that, upon the cap member 14' being telescoped on the upper end of the cylinder 12', the rib 32' is resiliently snap-fitted over the collar portion 18'. In this manner the cap member 14' is captured on the cylinder 12' so as to concentrically surround the cylinder upper open end 34' with the cap member 14' adapted to move axially or float relative thereto from its rest position shown in FIG. 1. It will be noted that the collar portion 18' has a plurality of spaced lugs 36' formed thereon adapted to space the cap member top open end 38' vertically above the cylinder upper open end 34'. The lugs 34' establish air passage gaps insuring minimal communication between the axle housing and the atmosphere with the cap member in its rest mode. Further, as seen in FIG. 1A, the collar portion 18' is formed with a pair of diametrically opposed slots 40' allowing air flow between the axle housing and the atmosphere. The rib 32' is axially spaced from the collar shoulder 40' a predetermined dimension such that upon the internal pressure of the axle housing being increased the cap member 14' is lifted to open the upper open end opening of the vent cap cylinder 12' overcoming the gravity force on the cap member 14' allowing the internal high pressure of the axle housing to be relieved through the gap formed between the collar brim and the cap member.

SUMMARY OF THE INVENTION

It is an object of the present invention to provide a integrally molded one piece vent cap adapted to receive one end of a flexible hollow conduit the other end of which is attached to a housing to be vented.

It is another object of the present invention to provide an integrally molded one piece cup-shaped vent cap formed with cylindrical outer wall having one end closed with an end wall and its other end open. A central stem element projects from the end wall and comprises a pair of mirror image spaced posts with each post having a semi-circular cross section. The posts define two opposite outer semi-cylindrical surfaces and two opposing inner parallel surfaces joined by an axially extending web centered on the cup principal axis. The web and the post inner opposed surfaces define a pair of axially extending channels.

Four uniformly spaced L-shaped ribs, each comprising an axial leg portion and a radial foot portion, radiate from the central stem element. Each foot portion radially inner edge is joined to an associated post semi-cylindrical surface while each leg portion radially outer edge is joined to the outer wall. The leg inner edge portions are radially spaced from the central stem element so as to define therebetween an intermediate concentric space. The space is adapted to fixedly capture one end of a flexible hollow conduit with the central stem element telescopically received in the conduit internal passage. The conduit internal surface cooperates with the pair of stem element channels to define a pair of axial inner flow passages while the conduit outer surface cooperates with the ribs and outer wall to define a plurality of outer flow passages. The foot portions have their one axial edge portions joined to the end cap and their other axial edge portions adapted to seat the conduit one end a predetermined distance from the end wall providing radially extending diametrically opposed crossover venting passages communicating with the inner and outer passages enabling the vent cap to provide venting communication between the housing and the atmosphere.

It is still another feature of the present invention to provide an integrally molded one piece vent cap having its cylindrical side wall formed with alternating thick and thin arcuate sections. By virtue of joining each of the radial ribs to an associated thin wall section each rib resilient flexibility in a radial direction is substantially enhanced. Applicant's unique vent cap wall structure allows the operator to readily insert one end of a flexible hollow conduit in the vent cap concentric space by obviating buckling of the conduit.

BRIEF DESCRIPTION OF THE DRAWINGS

Further objects, features, and advantages of the invention will become apparent to those skilled in the art upon reference to the following description and accompanying drawings in which:

FIG. 6 is a vertical sectional view taken on the line 6—6 of FIG. 3;

FIG. 7 is an enlarged fragmentary vertical sectional view taken on the line 7—7 of FIG. 3;

FIG. 8 is a fragmentary vertical sectional view, similar to the upper end portion of FIG. 4, showing a modified embodiment of the vent cap of FIGS. 1-7; and FIG. 9 is a horizontal sectional view similar to FIG. 5A, partly in elevation, of FIG. 8.

DETAILED DESCRIPTION OF THE INVENTION

Figure 1A:
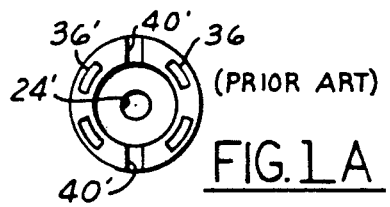
FIG. 1A is a horizontal sectional view taken on the line 1A—1A of prior art FIG. 1.
Figure 1:
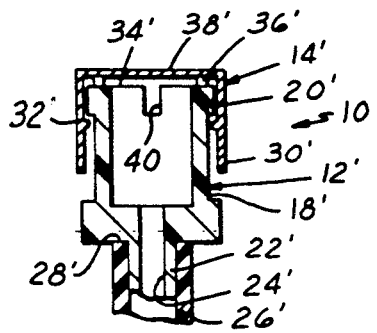
FIG. 1 an enlarged fragmentary vertical cross sectional view of a prior art two piece vent cap adapted for connection to one end of a flexible conduit.
Figure 2:
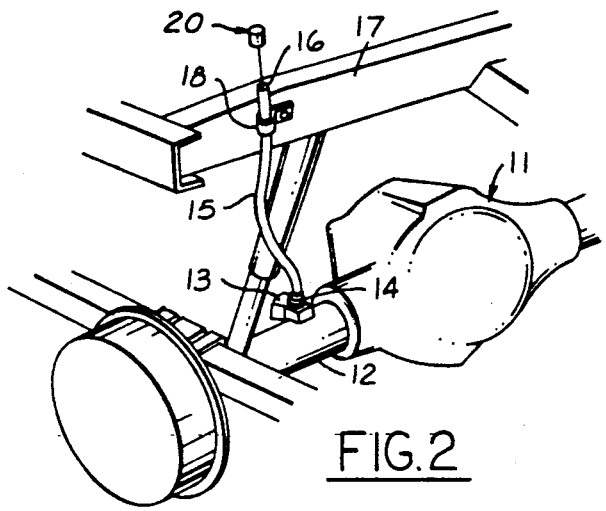
FIG. 2 is fragmentary perspective of a vehicle subframe showing a rear axle housing to which a preferred embodiment of an air vent cap of the present invention is remotely connected by means of a flexible conduit.

Referring now to the drawings, FIG. 2 shows an exploded perspective view of a portion of a vehicle subframe 10 showing a rear axle housing 11 having a hollow tubular portion 12 enclosing a half-shaft (not shown). The housing tubular portion 12 has an air bleed connector device 13 adjacent a vent hole (not shown) in the tubular portion with the connector supporting a sealing conduit clamp 14 receiving one lower end of a flexible hollow conduit 15. Upper free end 16 of the conduit 15 is supported on vehicle frame cross member 17 by a suitable clip 18.

A one-piece axle vent cap which is the subject of the present invention, indicated generally at 20 in FIG. 2, is adapted to be telescopically received on the upper free end 16 of the conduit 15. The vent cap 20, integrally molded or otherwise formed from a suitable plastic material, has a cylindrical outer wall 22 closed at its one upper end by end wall 24 and open at its lower end 25. A central stem element 26 comprises a pair of stem posts, shown at 28 in FIGS. 4-6, which project downwardly from the inner surface of the end wall 24 with their axis of symmetry coinciding with the principal axis "A" of the vent cap.

Figure 3:
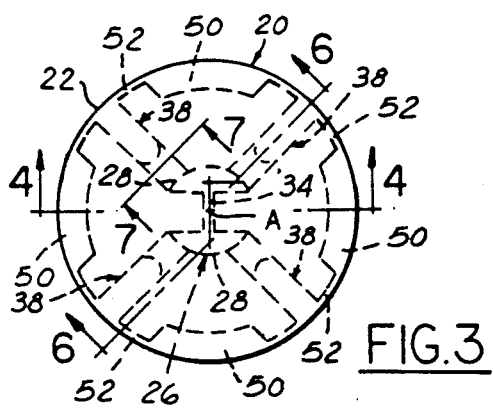
FIG. 3 is an enlarged top elevational view of the vent cap of FIG. 2.
Figure 5A:
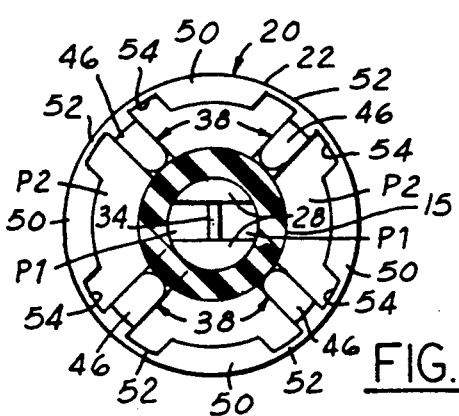
FIG. 5A is a horizontal sectional view, partly in elevation. taken on the line 5A—5A of FIG. 4.
Figure 5:
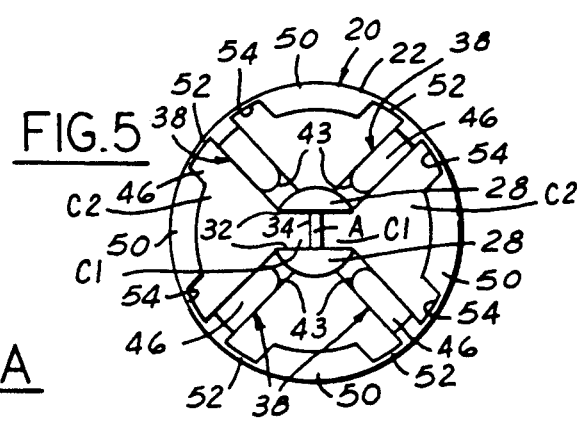
FIG. 5 is a bottom elevational view taken on the line 5—5 of FIG. 6.

The stem posts 28—28 are arranged in mirror image relation with each stem post having a semi-circular cross section. The stem posts 28—28 are symmetrically disposed in spaced opposed relation on either side of a longitudinal plane of symmetry which plane includes the section line 4—4 in FIG. 3. As seen in FIG. 5, the pair of posts 28—28 are shaped to provide two opposite outer semi-cylindrical surfaces 30—30 and two opposing inner planar parallel surfaces 32—32. It will be noted that the axis of curvature of the two semi-cylindrical surfaces 32—32 coincides with the vent cap principal axis "A". The pair of stem posts 28—28 are interconnected by an axially extending web portion 34 symmetrically disposed about the axis "A" with the web portion 34 oriented at right angles to the vertical plane of symmetry denoted by line 4—4 in FIG. 3. Thus, the two opposing inner planar post surfaces 32—32 in conjunction with the web 34 define a pair of axially extending diametrically opposed inner channels "C1" (FIG. 5) of predetermined cross-section. FIG. 5 also shows a pair of adjacent ribs 38 defining with the vent cap outer wall 22 a pair of diametrically opposed arcuate sectioned peripheral axially extending outer channels "C2".

With reference to FIGS. 5 and 6 four uniformly spaced axially extending radial ribs 38 ar shown radiating from the central stem element axis "A" in a symmetrical manner. In the preferred form a each adjacent pair of rib portions 38 integrally connect an associated stem post 28 with the inner surface of the cylindrical wall 22.

As best seen in FIG. 6, each rib portion 38 is generally L-shaped in side elevation having a vertical leg section 38a and a horizontal foot section 38b. The vertical leg section 38a outboard edge is formed integral with the outer wall 22 while the horizontal foot section 38b upper edge is formed integral with the end wall 24. As a result, an intermediate concentric space configured of predetermined extent to receive the conduit free end 16 is defined which circumscribes or surrounds the stem posts 28—28 and has a predetermined radial extent for telescopically receiving one free end 16 of the flexible hollow conduit 15 therein.

It will be seen in FIG. 6 that each rib foot section 38b defines a horizontal stop edge 40 axially spaced a predetermined dimension from inner surface 41 of the end wall 24. Further, each rib leg section 38a defines a vertically disposed axial edge portion 42. An intermediate radially inwardly extending pointed prong portion 43, formed on each rib leg section, is defined by the intersection of radially inwardly converging edge portions 44 and radially outwardly diverging edge portions 45. It will be noted that the four outwardly diverging rib edge portions 45 define a frusto-conical shaped entrance adapted to initially receive the one end 18 of the conduit 15 in a lead-in manner.

Figure 4:
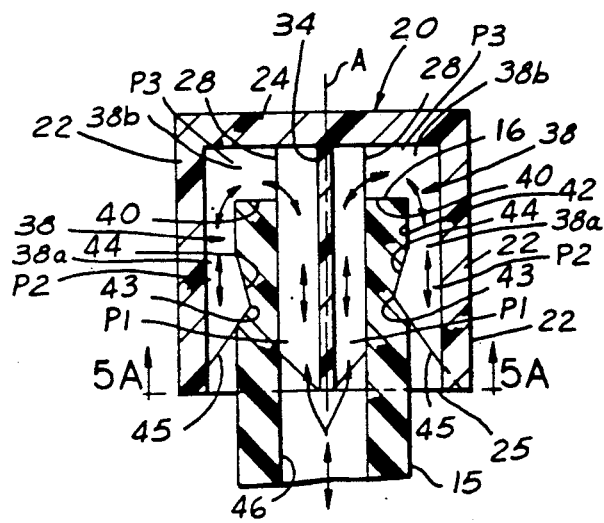
FIG. 4 is a vertical sectional view taken on the line 4—4 of FIG. 3.

It will be noted in FIG. 4 that the conduit 15 has a central passage 46 of circular cross section adapted to telescopically receive the pair of stem posts 28—28 therein in a snug close-fit manner upon the conduit one free end 16 being inserted in the vent cap open end 25. Thus, as seen in FIG. 5A, with the conduit one end 16 inserted in the vent cap and contacting the four stop edges 40 the stem pair of inner channels "C1" (FIG. 5) together with the inner surface of conduit passage 46 define a pair of inner air flow venting passages "P1" (FIG. 4). In a similar manner FIG. 5A shows the vent cap pair of outer diametrically opposed channels "C2" (FIG. 4) together with the outer surface of the conduit 15 defining a pair of outer air flow venting passages "P2".

The bi-directional arrows in FIG. 4 indicate that the vent cap 20 allows the air to flow in either direction between the axle housing 11 and the atmosphere. This results by means of the interconnected conduit passage 46, the inner venting passages "P1", the inverted U-shaped connecting or crossover passages "P3" (defined between the L-shaped ribs foot portions 38b), and the outer venting passages "P2" communicating with the atmosphere through cap open end 25.

With reference to FIG. 5 it will be seen that the cap cylindrical wall 22 comprises four relatively thick arcuate sections 50 separated by four relatively thin wall sections 52. The thick wall sections 50 have their centers spaced 90 degrees apart and arranged in a symmetrical diametrically opposed manner intermediate an associated adjacent pair of ribs 38. The thick wall sections 50 each subtend an equal arc of about 45 degrees radiating from the cap principal axis. The thick wall sections 50 are separated by the four diametrically opposed arcuate relatively thin wall sections 52 each of which also subtend equal arcs of about 45 degrees. Each of the four ribs 38 are integrally joined in a symmetrical manner to an associated thin wall section inner surface 54. The alternating thick 22 and thin 52 wall section arrangement enables the four ribs 38 to resiliently flex radially outwardly upon the conduit free end 18 being axially inserted in the vent cap concentric space. Thus, applicant's novel wall section design allows the conduit free end 16 to be readily seated on the foot portion stop edges 40 obviating crimping or buckling of the conduit 15. Further, each of the rib prongs 43 are biased radially inwardly into resilient locking engagement with the conduit outer surface.

With reference to FIG. 8, a modification of the vent cap of FIGS. 1-7 is shown wherein like components are identified by the same reference numerals as used in the description of FIGS. 1-7 except that they are primed. FIGS. 8 and 9 indicate a vent cap 20' having one pair of diametrically opposed ribs 70' with their foot portions 70b formed with a predetermined reduced axial dimension with respect to the remaining pair of foot portions 40'. This arrangement defines a pair of opposed free edges 72 offset upwardly a predetermined dimension from a horizontal plane that includes the remaining pair of opposed stop edges 40'.

Upon the conduit free end 16 being inserted in the vent cap open end concentric space it engages and seats on only the pair of diametrically opposed stop edges 40' so as to be axially spaced from the conduit free end 16. As seen in FIG. 8 the recessed or offset edges 72 define with the conduit free end 16 a pair of openings 74 providing communication between the diametrically opposed pair of outer air flow venting passages P2' and the remaining pair of diametrically opposed outer flow passages P4. Thus, the venting cap of FIGS. 8 and 9 achieves increased air flow by providing four outer flow passages rather than the pair of outer flow passages P2 of the FIGS. 1-7 embodiment.

Obviously, many variations and modifications of the present invention are possible in light of the above teachings. It is, therefore, to be understood that within the scope of the appended claims, the invention may be practiced otherwise than as specifically described.

What is claimed is:

1. A one-piece vent cap adapted to be received on one end of a flexible hollow elastomeric tubular conduit having a cylindrical cross section, said tubular conduit having the other end thereof sealingly connected to a vent hole in a housing enclosing an automotive component, said one-piece vent cap comprising:

an integrally formed flexible elastomeric cup-shaped vent cap having a cylindrical outer wall closed at one end thereof by an end wall, a central stem element projecting from said end wall inner surface thereof such that the symmetrical axis of said stem element coincides with the principal axis of said vent cap;

said stem element comprising a pair of mirror image posts with each said post having a semi-circular cross section, said pair of posts disposed in spaced opposed relation on either side of a first transverse plane of symmetry which includes said vent cup principal axis, said pair of posts having two opposite outer semi-cylindrical surfaces and two opposing inner planar parallel surfaces interconnected by an axially coextensive web, said web defining a second plane oriented normal to said first plane whereby said web portion and said opposed inner surfaces define a pair of axially coextensive oppositely facing central stem channels;

four uniformly spaced axially extending radial L-shaped ribs radiating from the principal axis of said vent cap, each said L-shaped rib comprising an axial leg portion and a radial foot, each said post semi-cylindrical outer surface joining radially inner vertical edge portions of an adjacent pair of said foot sections, said outer wall joining radially outer vertical edge portions of each said leg portion, whereby inner peripheral edge portions of the leg portions thereof and its associated post defining therebetween an intermediate concentric space having a predetermined radial extent adapted for fixedly receiving one end of the flexible hollow conduit therein, and whereby each said foot portion defining a radial inner edge providing a stop adapted to position said conduit one end in a predetermined axially spaced relation with said end wall, said end wall defining with said conduit free end two crossover radial passages;

each pair of adjacent ribs defining with said vent cap outer wall a pair of diametrically opposed arcuate sectioned axially extending outer channels;

said hollow conduit having a central passage of circular section sized to telescopically receive said pair of posts therein in a snug-fit manner, whereby said conduit central passage inner surface thereof defining with said pair of central stem channels a pair of sealed axially extending inner air passages and said conduit outer surface thereof defining with said pair of outer channels a pair of outer venting passages, such that said pair of crossover radial passages providing air flow communication between associated inner venting passages and associated outer venting passages so as to provide venting of said housing with the atmosphere.

2. The vent cap as set forth in claim 1, wherein each said leg section having the inner edge thereof formed with an inwardly projecting prong adapted to frictionally engage said conduit outer surface thereof to positively secure said conduit one end thereof in said vent cap.

3. The vent cap as set forth in claim 1, wherein said outer cylindrical wall in the form of two pair of diametrically opposed mirror image thick arcuate wall sections interspersed with two pair of diametrically opposed mirror image thin arcuate wall sections, each said thin wall section joining a radially outer vertical edge portion of an associated rib leg portion, whereby each said thin wall section adapted to radially flex outwardly facilitating the reception of said flexible hollow conduit in said concentric intermediate space.

4. The vent cap as set forth in claim 1, wherein a pair of diametrically opposed ribs having their foot portions forming a reduced axial dimension with respect to the remaining pair of diametrically opposed ribs, said remaining pair of diametrically opposed ribs each defining a radial inner edge providing a stop adapted to position said conduit one end in a predetermined axially spaced relation with said end wall;

said one pair of diametrically opposed ribs having their associated foot portions providing a pair of offset radial inner edges defining with the conduit free end a pair of openings establishing communication with a second pair of diametrically opposed arcuate sectioned peripheral axially extending outer venting passages.

* * * * *